United States Patent
Lyon et al.

(10) Patent No.: US 10,377,913 B2
(45) Date of Patent: Aug. 13, 2019

(54) HIGH REFRACTIVE INDEX NANOCOMPOSITES

(71) Applicant: Corning Incorporated, Corning, NY (US)

(72) Inventors: Jennifer Lynn Lyon, Painted Post, NY (US); Pamela Arlene Maurey, Savona, NY (US); Wageesha Senaratne, Horseheads, NY (US); Arlin Lee Weikel, Mansfield, PA (US); Ying Zhang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/699,493

(22) Filed: Sep. 8, 2017

(65) Prior Publication Data
US 2018/0079925 A1   Mar. 22, 2018

Related U.S. Application Data

(60) Provisional application No. 62/395,525, filed on Sep. 16, 2016.

(51) Int. Cl.
| | |
|---|---|
| *C08F 2/46* | (2006.01) |
| *C08F 2/50* | (2006.01) |
| *C08G 61/04* | (2006.01) |
| *C09D 133/02* | (2006.01) |
| *C09D 4/00* | (2006.01) |
| *G02B 1/04* | (2006.01) |
| *C09D 133/04* | (2006.01) |
| *G02B 6/122* | (2006.01) |
| *G02B 6/124* | (2006.01) |

(52) U.S. Cl.
CPC ............. *C09D 133/02* (2013.01); *C09D 4/00* (2013.01); *C09D 133/04* (2013.01); *G02B 1/045* (2013.01); *G02B 1/04* (2013.01); *G02B 6/124* (2013.01); *G02B 6/1221* (2013.01)

(58) Field of Classification Search
CPC ...... C09D 133/02; C09D 4/00; C09D 133/04; C08K 7/16; G02B 1/04; G02B 1/045; G02B 6/124; G02B 6/1221
USPC ................. 522/64, 71, 189, 184, 1, 6; 520/1
See application file for complete search history.

(56) References Cited

U.S. PATENT DOCUMENTS

| | | | | |
|---|---|---|---|---|
| 2003/0092790 A1* | 5/2003 | Yamaguchi | ............... | C08F 2/44 522/81 |
| 2006/0002875 A1* | 1/2006 | Winkler | ................... | A61K 8/11 424/63 |
| 2009/0220770 A1* | 9/2009 | Ueno | ........................ | C08F 2/44 428/328 |
| 2010/0075062 A1 | 3/2010 | Wang et al. | | |
| 2013/0116362 A1* | 5/2013 | Yamazaki | ................. | C08F 2/44 523/458 |
| 2014/0322549 A1 | 10/2014 | Xu et al. | | |

FOREIGN PATENT DOCUMENTS

| | | |
|---|---|---|
| JP | 2007291195 A | 11/2007 |
| WO | 0148095 A1 | 7/2001 |
| WO | 2004079407 A1 | 9/2004 |
| WO | 2011140018 A1 | 11/2011 |
| WO | 2015092466 A1 | 6/2015 |

OTHER PUBLICATIONS

International Search Report and Written Opinion PCT/US2017/051052 dated Mar. 23, 2018.
LEVOLA "Diffractive Optics for Virtual Reality Displays"; Journal OS The SID, 14/5, 2006, 467-475.
Liu et al; "High Refractive Index Polymers: Fundamental Research and Practical Applications"; J. Mater. Chem. 2009, 19, 8907-8919.
Lu et al; "High Refractive Index Organic-Inorganic Nanocomposites: Design, Synthesis and Application"; J. Mater. Chem., 2009, 19, 2884-2901.
Tsai et al; "High Refractive Index Transparent Nanocomposites Prepared by In Situ Polymerization"; J. Mater. Chem. C. 2014, 2, 2251-2258.

* cited by examiner

*Primary Examiner* — Jessica Whiteley
(74) *Attorney, Agent, or Firm* — Kevin L. Bray

(57) ABSTRACT

A composite coating having a high refractive index, high Abbe number, low haze and high transmittance, suitable for fabricating nanoscale optical surface features includes a resin with a crosslinked polymer matrix having polymers with repeat units derived from acrylic or methacrylic monomers or oligomers and inorganic nanoparticles disposed within the resin, wherein the composite coating has a refractive index equal to or greater than 1.7 and a glass transition temperature equal to or greater than 60° C.

16 Claims, 3 Drawing Sheets

HIGH REFRACTIVE INDEX NANOCOMPOSITES

This application claims the benefit of priority under 35 U.S.C. § 119 of U.S. Provisional Application Ser. No. 62/395,525 filed on Sep. 16, 2016 the content of which is relied upon and incorporated herein by reference in its entirety.

FIELD OF THE DISCLOSURE

This disclosure pertains to photocurable compositions useful for preparing optical elements having a high refractive index, and more particularly to such compositions useful in fabrication of optical elements having nanoscopic surface features.

BACKGROUND OF THE DISCLOSURE

High refractive index polymers (HRIPs) have attracted much attention with the increased use of organic light-emitting diodes (OLEDs), antireflective coatings, near to eye (NTE) displays, etc. Typical refractive indices (RIs) required for these applications are about 1.7 or greater. It is also common for HRIPs to undergo nano-replication to form gratings in various products. UV cured HRIPs are preferred for their high production speeds and ability to be nano-replicated in situ. Different patterns and features are used to efficiently couple light into and out of light guides. In addition, high refractive index materials are known to improve in-coupling efficiencies. Another feature of the nano-replicated materials is an ability to capture and emit light from various angles and wavelengths to improve the field of view for an electronic device such as virtual reality glasses. Device success depends on the efficiency of the high refractive index polymer to promote light coupling into the light guide and reduce scattering that allows wide angle field of views (FOVs).

High refractive index polymers are desired because they allow (1) improved total internal reflectance of light passing through a waveguide, thereby reducing light loss; and (2) improved angles at which light can enter and exit the light guide (i.e., a higher refractive index produces a larger field of view). FIG. 2 is a graph demonstrating the importance of refractive index and the effect that it has on field of view as a function of coefficient R (the ratio of the tangent of the largest diffracted angle of the longest wavelength to the tangent of the smallest diffracted angle of the shortest wavelength). The coefficient R is a measure of the maximum ratio of the step lengths of the beams between total internal reflections. Material with an R value of 5 or greater will have trouble extracting the longer wavelengths out of the guide material. As shown in FIG. 2, there are many types of polymers that can exhibit improved refractive index values, including polycarbonates and polyimides (not shown).

However, most of these materials do not possess the ability to be replicated at nano-scale dimensions required to make gratings for waveguides. Lower viscosity material is desired to facilitate shaping of a desired grating profile that is cured in place. UV cured (meth) acrylics, vinyls and epoxies are suitable for gratings that can be mechanically replicated. Additionally, some applications require use of resin material that is mechanically stable (high Tg) above 50° C. or even 100° C., while still achieving refractive indices of 1.7 or greater. Known materials have been selected to achieve either high RI (with low Tg) or high Tg (with low RI). The literature has focused on developing high RI materials with no emphasis on mechanical stability at high temperatures. Current product needs dictate that high RI materials are warranted, but thermal stability, mechanical stability, high Abbe number, low haze and high transmittance must also be designed into the finished product.

SUMMARY OF THE DISCLOSURE

A curable composition for a high refractive index composite coating (i.e., n≥1.7) is disclosed. The composite coating simultaneously achieves high refractive index and high dynamic mechanical stability (i.e., a glass transition temperature greater than or equal to 60° C.), while also exhibiting a suitably high constringence (i.e., Abbe number), low haze and high transmittance.

The composite material formed from the curable coating composition includes a resin with nanoscopic inorganic particles dispersed within the resin. The resin is a polymer matrix that includes polymers with acrylic and/or methacrylic repeat units. The composite coating has a refractive index equal to or greater than 1.7 and a glass transition temperature greater than or equal to 60° C.

The curable coating composition includes at least one di-functional or polyfunctional acrylic monomer or methacrylic monomer, an optional solvent in which the monomer(s) are dissolved, a polymerization initiator capable of initiating polymerization of the monomer(s) when exposed to suitable activating energy, and nanoscopic inorganic particles. The composite coating formed by curing the curable coating composition exhibits a refractive index greater than or equal to 1.7 and a glass transition temperature greater than or equal to 60° C.

DETAILED DESCRIPTION OF SPECIFIC EMBODIMENTS

Figure 1:
FIG. 1 is a typical nano-replicated pattern used to capture and release light from a waveguide.
Figure 2:
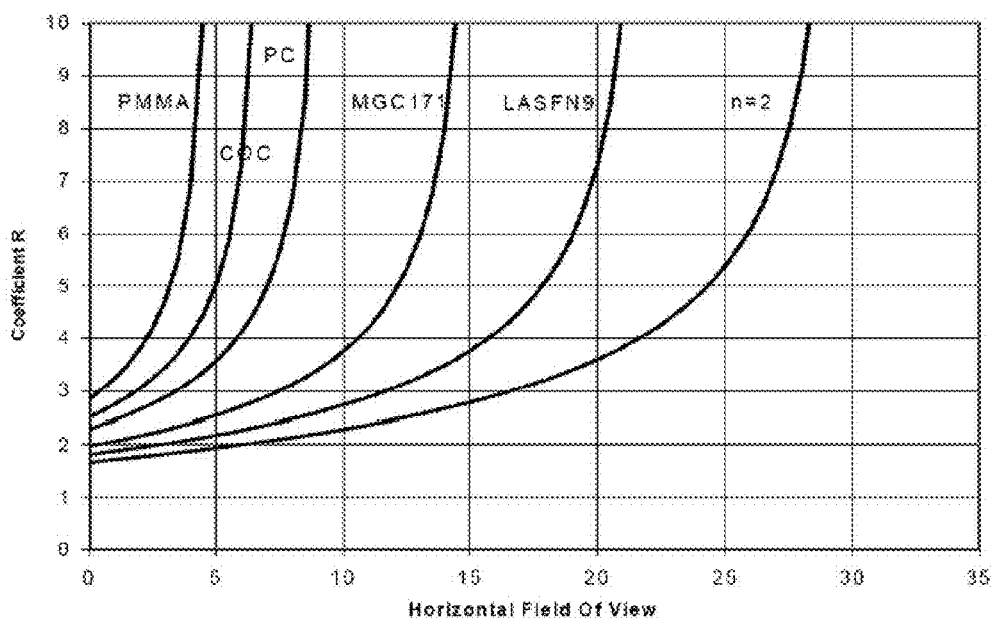
FIG. 2 is a graph showing the coefficient R as a function of horizontal FOV for different materials for wavelengths 465-645 nm, including from left to right: polymethyl methacrylate (PMMA) ($n_D$=1.49), a cyclic-olefin copolymer (COC) ($n_D$=1.53), polycarbonate (PC) ($n_D$=1.59), episulfide MGC171 ($n_D$=1.71), Schott glass (LASFN9) ($n_D$=1.85), and the last curve is for $n_D$=2.

Composite coatings having high refractive index and high glass transition temperature ($T_g$) are disclosed. The composite coatings are formed from a curable coating composition that includes one or more curable components, inorganic nanoparticles, and a polymerization initiator. The curable coating composition optionally includes a solvent and one or more additives. Upon curing the curable coating composition, the mixture of one or more curable components forms a resin in which the inorganic nanoparticles are incorporated to form a composite coating.

The curable coating compositions include one or more curable components. As used herein, the term "curable" is intended to mean that the component, when exposed to a suitable source of curing energy, includes one or more curable functional groups capable of forming covalent bonds that participate in linking the component to itself or to other components to form a polymeric material. The product obtained by curing a curable coating composition may be referred to herein as the cured product of the composition. The curing process may be induced by energy. Forms of energy include radiation or thermal energy. A radiation-curable component is a component that can be induced to undergo a curing reaction when exposed to radiation of a suitable wavelength at a suitable intensity for a sufficient period of time. The radiation curing reaction may occur in the presence of a photoinitiator. A radiation-curable component may also optionally be thermally curable. Similarly, a thermally-curable component is a component that can be induced to undergo a curing reaction when exposed to thermal energy of sufficient intensity for a sufficient period of time. A thermally curable component may also optionally be radiation curable.

A curable component includes one or more curable functional groups. A curable component with only one curable functional group is referred to herein as a monofunctional curable component (e.g. monomers having a single acryloyl group). A curable component having two or more curable functional groups is referred to herein as a multifunctional curable component or a polyfunctional curable component. Multifunctional curable components include two or more functional groups capable of forming covalent bonds during the curing process and can introduce crosslinks into the polymeric network formed during the curing process. Multifunctional curable components are also referred to herein as "crosslinkers" or "curable crosslinkers". Curable components include monomers with one or more curable functional groups, oligomers with one or more curable functional groups, and combinations of monomers with one or more curable functional groups and oligomers with one or more curable functional groups. Preferred curable components include acrylic and methacrylic monomers and oligomers.

The disclosed composite coatings simultaneously achieve a high refractive index (n≥1.7) and high dynamic mechanical stability (Tg≥60° C.). A curable coating composition including acrylic, methacrylic, and/or vinyl monomers or oligomers combined with inorganic nanoparticles (e.g., zirconium dioxide) is cured, in one embodiment, to provide a composite coating having the disclosed refractive index and mechanical stability.

The disclosed curable coating compositions and composite coatings formed therefrom can be index matched to glass or other substrates having a high index of refraction. This allows an end user to integrate replication features (such as grooves that form a diffraction grating) with the glass or other substrate to direct light as desired into, out of or within the glass or other substrate and provides materials needed to manufacture devices employing HRIP coatings. These materials can be used, for example, in the field of augmented reality.

The composite coatings described in this disclosure include a resin and inorganic nanoparticles disposed within the resin. The resin is a polymer matrix formed as the cured product of a resin formulation. The resin formulation includes the one or more curable components and polymerization initiator of the curable coating composition without the inorganic nanoparticles. In a preferred embodiment, the polymer matrix includes polymers with repeat units derived from acrylic and/or methacrylic monomers or oligomers. The polymer matrix is a continuous polymer network in which the nanoparticles are disposed. The polymer network is typically crosslinked to provide mechanical strength to the composite coating. The inorganic nanoparticles can be physically held within the polymer network, or can be functionalized, such as with an acrylic or vinyl functional group, so that the nanoparticles can become chemically (i.e. covalently) bonded to the polymer network. Surface-functionalized inorganic nanoparticles are commercially available, such as from Pixelligent, or can be prepared in accordance with methods disclosed in publicly available literature.

The polymers of the polymer matrix are comprised of repeat units that are the residue of acrylic and/or methacrylic monomers or oligomers. The term "repeat unit" refers to the molecular structure of the residue of a monomer, with the polymer matrix typically including polymers comprised of different repeat units that occur at multiple locations within the polymer network. In certain embodiments, the majority of the repeat units (e.g., greater than 70%, or greater than 80% or greater than 90%, by weight) of the polymers of the polymer matrix are derived from bifunctional or polyfunctional (i.e., having three or more linkages that are the residue of reactive functional groups, such as acrylate or methacrylate groups) monomers or oligomers. However, in other embodiments, less than a majority (i.e., <50%) of the repeat units are derived from bifunctional or multifunctional monomers or oligomers. The balance of the repeat units of the polymers of the polymer matrix is derived from monofunctional monomers or oligomers. The resin can include a polymer network with polymers having at least two different repeat units derived from acrylic or methacrylic monomers or oligomers.

The weight ratio of resin to inorganic particles in the composite coating can be from 1:5 to 1:1. At least 90% by weight of the resin can consist of repeat units derived from one or more bifunctional, one or more polyfunctional or a combination of one or more bifunctional and one or more polyfunctional monomers or oligomers. In one embodiment, the resin comprises from 25% by weight to 60% by weight of repeat units derived from one or more trifunctional monomers or oligomers, from 40% by weight to 80% by weight of repeat units derived from one or more bifunctional monomers or oligomers, and, optionally up to 10% by weight of repeat units derived from one or more monofunctional monomers or oligomers. In another embodiment, the resin comprises from 50% by weight to 100% by weight of repeat units derived from one or more bifunctional monomers or oligomers, optionally up to 50% by weight of repeat units derived from one or more trifunctional monomers or oligomers, and optionally up to 10% by weight of repeat units derived from one or more monofunctional monomers or oligomers.

The trifunctional monomer or oligomer can be tris(2-hydroxyethyl isocyanurate) triacrylate. The bifunctional monomer or oligomer can be an aliphatic urethane acrylate monomer or oligomer, an aromatic urethane acrylate monomer or oligomer, bisfluorene diacrylate (9,9-bis[4-(2-acryloyloxyethyl)phenyl]fluorene), or biphenylmethyl acrylate. Monofunctional monomers or oligomers include n-vinyl caprolactam, acrylic acid, and hydroxybutyl acrylate.

The composite coating is prepared from a curable coating composition that includes one or more curable components, inorganic nanoparticles, and optionally a polymerization initiator. The curable coating composition optionally includes a solvent and a dispersing medium for the inorganic nanoparticles. The one or more curable components include at least one bifunctional or polyfunctional acrylic or methacrylic monomer or oligomer. The one or more curable components optionally include at least one monofuctional acrylic or methacrylate monomer or oligomer. The optional polymerization initiator is capable of initiating polymerization of the one or more curable components to form a cured product upon exposure of the curable composition to activating energy. Optional solvents include propylene glycol monomethyl ether acetate.

Preferred inorganic nanoparticles include nanoparticles having a high refractive index. Examples include zirconium dioxide ($ZrO_2$) and functionalized zirconium dioxide (e.g., acrylate functionalized zirconium dioxide). The inorganic nanoparticles have dimensions (e.g., hydrodynamic radius) in a range from about 1 nm to about 100 nm or to about 10 nm. The inorganic nanoparticles may be provided in the form of a dispersion that includes the inorganic nanoparticles in a dispersing medium. If present with the inorganic nanoparticles, the dispersing medium becomes an additional component of the curable coating composition.

The polymerization initiator induces or promotes reaction of curable functional groups of the one or more curable components in the curable coating composition to provide a cured product. Polymerization initiators include thermal initiators, chemical initiators, electron beam initiators, and photoinitiators. Photoinitiators are the preferred polymerization initiators. Photoinitiators are reactive components and undergo reaction, rearrangement, or decomposition to provide chemical species (e.g. free radicals) capable of initiating a photoreaction with a curable component. For most curable components based on acrylic or methacrylic monomers or oligomers, photoinitiators, such as ketonic photoinitiators and/or phosphine oxide photoinitiators, are preferred. When used in the curable coating composition, the photoinitiator is present in an amount sufficient to provide rapid curing. Curing of photocurable components is preferably accomplished with UV radiation.

Suitable photoinitiators include, without limitation, 1-hydroxycyclohexyl-phenyl ketone (e.g. Irgacure 184 available from BASF), (2,6-dimethoxybenzoyl)-2,4,4-trimethylpentyl phosphine oxide (e.g. commercial blends Irgacure 1800, 1850, and 1700 available from BASF), 2,2-dimethoxyl-2-phenyl acetophenone (e.g. Irgacure 651, available from BASF), bis(2,4,6-trimethyl benzoyl)phenyl-phosphine oxide (e.g. Irgacure 819, available from BASF), (2,4,6-trimethylbenzoyl)diphenyl phosphine oxide (e.g. Lucirin TPO available from BASF, Munich, Germany), ethoxy(2,4,6-trimethylbenzoyl)phenyl phosphine oxide (e.g. Lucirin TPO-L from BASF), and combinations thereof.

The "Abbe number" for the composites disclosed herein is relatively high, e.g., greater than 29, and is determined by the formula $V_D = (n_D - 1)/(n_F - n_C)$, wherein $V_D$ is the Abbe number (or constringence), $n_D$, $n_F$ and $n_C$ are the refractive indices of the material (composite) at the wavelengths of the Fraunhofer D-, F- and C-spectral lines (589.3 nm, 486.1 nm and 656.3 nm, respectively).

The composite coatings can be integrated with glass or other substrates for use in augmented reality devices. Gratings formed in the composite coating can couple light into and out of the glass or other substrate used in the augmented reality device. Gratings can be formed in the composite coating through nanoreplication techniques known in the art. Composite coatings formed as cured products of curable coating compositions are preferred because the curing process can be performed at high process speeds and gratings can be formed in the cured product in situ.

EXAMPLES

The following Examples present illustrative composite coatings, curable coating compositions, and curable components. Table 1 lists materials used in the curable coating compositions of the illustrative Examples. All materials were used as received. Table 1 also includes abbreviations used to refer to each compound and supplier information. PGMEA (propylene glycol monomethyl ether acetate, also known as 2-(1-methoxy)propyl acetate) was used as a dispersing medium for the $ZrO_2$ nanoparticles and as a solvent in the curable coating composition.

The $ZrO_2$ nanoparticles were obtained from the vendor (Pixelligent) in the form of a dispersion that included 50 percent by weight of $ZrO_2$ nanoparticles in PGMEA as the dispersing medium. The $ZrO_2$ nanoparticles were approximately spherical in shape with diameters less than 30 nm, with a majority of nanoparticles having a diameter in a range from 2 nm to 10 nm. $ZrO_2$ nanoparticles with Product Nos. PCPB-2-50-PGA and the $ZrO_2$ nanoparticles with Product No. PCPN-2-50-PGA were used. The $ZrO_2$ nanoparticles are stabilized with surface coatings that are proprietary to the vendor. Based on experiments, the $ZrO_2$ nanoparticles are estimated to have a refractive index of about 1.9 to 2.0.

TABLE 1

| Chemical | Product No. | Supplier |
| --- | --- | --- |
| Tris (2-hydroxyethyl) isocyanurate triacrylate | SR368 | Sartomer |
| N-vinyl caprolactam (NVC) | 415464 | Aldrich |
| Aromatic urethane di-functional acrylate oligomer | Miramer HR3700 | Miwon |
| Acrylic Acid Glacial (AA) | Norsocryl ® GAA FG | Arkema |
| Biphenylmethyl acrylate (BPMA) | Miramer M1192 | Miwon |
| 2,4,6-trimethylbenzoyl)diphenyl phosphine oxide (TPO) | Lucirin TPO | BASF |
| 4-Hydroxy butyl acrylate (HBA) | 4-HBA | BASF |
| Fluorene diacrylate | Miramer HR6042 | Miwon |
| $ZrO_2$ nanoparticles | PCPB-2-50-PGA | Pixelligent |
| $ZrO_2$ nanoparticles | PCPN-2-50-PGA | Pixelligent |
| Propylene glycol monomethyl ether acetate (PGMEA) | 537543 | Sigma Aldrich |

Tables 2 and 3 list components and amounts (expressed as percent by weight (wt %)) for several resin formulations. The resin formulations are identified by a Sample number. Tables 2 and 3 also list the refractive index (n) at 589 nm for each resin formulation in the liquid state before curing. Each resin formulation included TPO photoinitiator in an amount 0.1 pph, where the unit "pph" signifies an amount relative to the combined amount of the curable components of the resin formulation. As indicated in Tables 2 and 3, the combined amounts of curable components constitute 100% by weight of the resin formulation. Relative to this basis, 0.1 pph means that 0.1 g of photoinitiator per 100 g of combined curable components was included in the resin formulation.

TABLE 2

| Sample | SR368 (wt %) | NVC (wt %) | HR3700 (wt %) | AA (wt %) | M1192 (wt %) | TPO (pph) | $n_D$ (@589.3 nm) |
| --- | --- | --- | --- | --- | --- | --- | --- |
| 1A | 30 | | 70 | | | 1 | 1.5650 |
| 1B | 30 | 5 | 65 | | | 1 | 1.5610 |
| 1C | 30 | | 65 | 5 | | 1 | 1.5562 |
| 1D | 45 | | | | 55 | 1 | 1.5641 |
| 1E | 45 | 5 | | | 50 | 1 | 1.5586 |
| 1F | 45 | | | 5 | 50 | 1 | 1.5544 |

TABLE 3

| Sample | SR368 (wt %) | HBA (wt %) | HR3700 (wt %) | AA (wt %) | HR6042 (wt %) | TPO (pph) | $n_D$ (@589.3 nm) |
|---|---|---|---|---|---|---|---|
| 2A | 20 | | | | 80 | 1 | 1.5830 |
| 2B | 40 | | | | 60 | 1 | 1.5675 |
| 2C | 5 | | 20 | | 75 | 1 | 1.5940 |
| 2D | 5 | 5 | 10 | | 80 | 1 | 1.5872 |
| 2E | | | 15 | 5 | 80 | 1 | 1.5891 |

Preparation of Resin Formulations

Sample 1A (Table 2) will be used as an example to describe the preparation of resin formulations. All other resin formulations in Table 2 and Table 3 followed similar preparation procedures. Tris(2-hydroxyethyl) isocyanurate triacrylate (SR368) (6.0 g), a low viscosity and high refractive index two functional urethane acrylate (HR 3700) (14 g), and photoinitiator 2,4,6-trimethylbenzoyl)diphenyl phosphine oxide (TPO) (0.20 g) were combined, heated at 50 degrees Celsius and mixed until all components were dissolved to obtain a homogenous liquid resin.

Refractive Index of Liquid Resin

The refractive index ($n_D$) of the homogeneous liquid resin formulations was measured at 589.3 nm using a sodium source refractometer. Refractive index values of the liquid resin formulations are listed in Tables 2 and 3. Refractive index was measured using a Milton Roy Company refractometer model LE07 according to standard operating instructions.

Preparation of Resins

Resins were formed from by curing the resin formulations. Liquid resin formulation was added to fill a 10 mm thick gap between opposing Mylar release liners and cured using a Fusion D bulb (1 pass at 10 feet/minute) with total dose of 1055 mJ/cm² (measured at 365 nm).

Glass Transition Temperature of Resins

The glass transition temperature ($T_g$) of resins formed from the resin formulations were measured by the DMA (dynamic mechanical analysis) technique. The measurements were completed using a Rheometrics DMTA IV instrument equipped with a rectangular tension fixture. The gauge length of the instrument was 10 mm. The resin samples were thin films having a width of 3-4 mm and a thickness of 0.2 mm to 0.4 mm. The analysis was conducted using a temperature ramp starting at 0° C. and increasing to 200° C. at a rate of 2° C./min. A dynamic strain of 0.03% (3.0 μm) at a test frequency of 1.0 Hz was used. To prevent sample buckling, the Auto-Tension feature of the instrument was activated and a Static>Dynamic force of 10% was programmed. The data were analyzed using TRIOS software from TA Instruments. $T_g$ was determined as the maximum of the tan δ peak, where the tan δ peak is defined as $$\tan \delta = E''/E'$$

where E" is the loss modulus, which is proportional to the loss of energy as heat in a cycle of deformation, and E' is the storage or elastic modulus, which is proportional to the energy stored in a cycle of deformation.

The glass transition temperatures for resins formed from the different resin formulations are summarized in Table 4.

TABLE 4

| Resin Formulation | Resin $T_g$ (° C.) |
|---|---|
| 1A | 112 |
| 1B | 111 |
| 1C | 125 |
| 1D | 104 |
| 1E | 114 |
| 1F | 134 |
| 2A | 109 |
| 2B | 133 |
| 2C | 84 |
| 2D | 92 |
| 2E | 95 |

Preparation of Curable Coating Compositions

Curable coating compositions were prepared with inorganic nanoparticles and the resin formulations listed in Tables 2 and 3. The nanoparticle dispersions were combined with the resin formulations in a vessel and vortexed to form curable coating compositions in the form of clear-translucent solutions. After forming clear-translucent solutions, the stability of the curable coating compositions was monitored for up to two days to insure that settling of large particles, precipitation, or changes in color did not occur. Once stability of the curable coating compositions was verified, curing was commenced to form composite coatings.

Various proportions of the resin formulations and nanoparticle dispersions were combined to form curable coating compositions. The relative proportions were controlled to provide curable coating compositions with expected refractive indices (at 589 nm) in the range from 1.68-1.72. The resin formulations, nanoparticle dispersions, and solvents used to form illustrative curable coating compositions are summarized in Tables 5-9. The resin formulations are identified by the labels shown in Tables 2 and 3. The nanoparticle dispersions are identified by the labels "PCPB" and "PCPN", which refer to the entries PCPB-2-50-PGA and PCPN-2-50-PGA, respectively, shown in Table 1. PGMEA was included as a solvent. The relative proportions of resin formulation, nanoparticle dispersion, and solvent are listed in units of percent by weight (wt %).

TABLE 5

| Curable Coating Composition | Resin Formulation | Nanoparticle Dispersion | Solvent |
|---|---|---|---|
| 1 | 1A-10 wt % | PCPB-42 wt % | PGMEA-48 wt % |
| 2 | 1B-10 wt % | PCPB-42 wt % | PGMEA-48 wt % |
| 3 | 1C-10 wt % | PCPN-45 wt % | PGMEA-45 wt % |
| 4 | 1D-10 wt % | PCPN-45 wt % | PGMEA-45 wt % |
| 5 | 1E-10 wt % | PCPB-42 wt % | PGMEA-48 wt % |
| 6 | 1F-10 wt % | PCPB-42 wt % | PGMEA-48 wt % |

TABLE 6

| Curable Coating Composition | Resin Formulation | Nanoparticle Dispersion | Solvent |
|---|---|---|---|
| 7 | 1F-10 wt % | PCPB-42 wt % | PGMEA-48 wt % |
| 8 | 1F-20 wt % | PCPB-40 wt % | PGMEA-48 wt % |

TABLE 6-continued

| Curable Coating Composition | Resin Formulation | Nanoparticle Dispersion | Solvent |
|---|---|---|---|
| 9 | 1F-18 wt % | PCPB-36 wt % | PGMEA-46 wt % |
| 10 | 1F-7.5 wt % | PCPB-31.5 wt % | PGMEA-61 wt % |
| 11 | 1F-12 wt % | PCPB-24 wt % | PGMEA-64 wt % |
| 12 | 1F-10 wt % | PCPB-20 wt % | PGMEA-70 wt % |

TABLE 7

| Curable Coating Composition | Resin Formulation | Nanoparticle Dispersion | Solvent |
|---|---|---|---|
| 13 | 1F-25 wt % | PCPB-37 wt % | PGMEA-38 wt % |
| 14 | 1F-22.5 wt % | PCPB-33 wt % | PGMEA-44.5 wt % |
| 15 | 1F-18.75 wt % | PCPB-27.75 wt % | PGMEA-53.5 wt % |
| 16 | 1F-15.5 wt % | PCPB-22.9 wt % | PGMEA-61.6 wt % |
| 17 | 1F-12.5 wt % | PCPB-18.5 wt % | PGMEA-69.0 wt % |
| 18 | 1F-9.0 wt % | PCPB-13.3 wt % | PGMEA-77.7 wt % |

TABLE 8

| Curable Coating Composition | Resin Formulation | Nanoparticle Dispersion | Solvent |
|---|---|---|---|
| 19 | 1A-10 wt % | PCPB-42 wt % | PGMEA-48 wt % |
| 20 | 1B-10 wt % | PCPB-42 wt % | PGMEA-48 wt % |
| 21 | 1C-10 wt % | PCPN-45 wt % | PGMEA-45 wt % |
| 22 | 1D-10 wt % | PCPN-45 wt % | PGMEA-45 wt % |
| 23 | 1E-10 wt % | PCPB-42 wt % | PGMEA-48 wt % |
| 24 | 1F-10 wt % | PCPB-42 wt % | PGMEA-48 wt % |

TABLE 9

| Curable Coating Composition | Resin Formulation | Nanoparticle Dispersion | Solvent |
|---|---|---|---|
| 25 | 2A-10 wt % | PCPB-45 wt % | PGMEA-45 wt % |
| 26 | 2B-10 wt % | PCPB-45 wt % | PGMEA-45 wt % |
| 27 | 2C-10 wt % | PCPB-45 wt % | PGMEA-45 wt % |
| 28 | 2D-10 wt % | PCPB-45 wt % | PGMEA-45 wt % |
| 29 | 2E-10 wt % | PCPB-45 wt % | PGMEA-45 wt % |

Formation of Composite Coatings

EXG glass (Eagle XG® glass, an alkaline earth boroaluminosilicate glass available from Corning, Inc.) was selected as a substrate for forming composite coatings from the curable coating compositions listed in Tables 5-9. Prior to coating, the EXG glass was cleaned using a SemiClean (2-4%) detergent wash followed by rinsing with hot water and drying in air. Glass was then treated in air at the high power setting (29.6 W) for 5 minutes. The curable coating composition was then filtered onto the glass substrate and spin coated at room temperature using a Laurell Model WS-650-23 Spin Coater. Spin coating was accomplished at two speeds for composite coatings formed from curable compositions 1-29: 1000 rpm for 35 sec followed by 3000 rpm for 35 sec. Spin coating was followed by heat treatment at 80° C. for 15 minutes and UV curing at 365 nm under nitrogen following a nitrogen purge for 30 min. The curing source was a 365 NM LED from Phoseon (model FJ800), which provided 365 nm radiation at a 33 mW/cm². Cure time was 10 sec to provide a total curing dose of 330 J (at the surface of the curable composition). The coated glass substrate was positioned about 7 cm from the housing of the source and about 18 cm from bulb of the source.

Properties of Composite Coatings

The thickness, refractive index at 588 nm, transmittance and haze were measured for composite coatings formed from several of the curable coating compositions listed in Tables 5-9. Refractive index at 588 nm was calculated instead of measured for composite coatings formed from some of the curable coating compositions. Abbe number was measured for composite coatings formed from curable coating compositions 19-29. The measurement procedures are described below and the results are presented in Tables 10-14 below. Tables 10-14 list illustrative composite coatings corresponding with the curable coating composition (numbered according to Tables 5-9), thickness of the composite coating, refractive index of the composite coating, transmittance (reported as percent transmittance (% T)) of the composite coating, and haze (reported as percent haze (% H)) of the composite coating.

Measurement of Refractive Index and Abbe Number.

Figure 3:
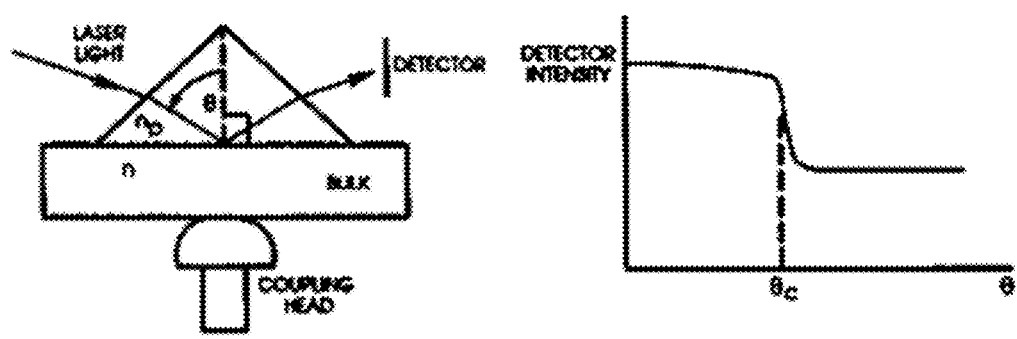
FIG. 3 depicts the prism coupling method for determining the refractive index of a bulk material or thin film.

The index of refraction and Abbe number measurements were performed on a Metricon Model 2010 prism coupler. The Metricon Model 2010 prism coupler was equipped with laser sources capable of providing light at discrete wavelengths in the range from 473 nm to 1549 nm. The Metricon 2010 prism coupler operates as a fully automated refractometer, in which the refractive index of bulk materials and/or films can be measured. The principle of determining refractive index using the prism coupling technique is illustrated in FIG. 3. If a material with an index of n is coupled to a prism with an index $n_p$, laser light directed onto the base of the prism will be totally reflected until the angle of incidence $\theta$ becomes less than the critical angle $\theta_c$ where: $\theta_c$=arcsin $(n/n_p)$. The critical angle $\theta_c$ is measured using a photodetector since the intensity on the detector changes abruptly as the angle of incidence $\theta$ drops below the critical angle $\theta_c$. Since $n_p$ is known, n can be determined from the above equation. Operating conditions used for the Metricon 2010 prism coupler were: P-2 prism −4510.9, averages −1, full step, single film mode contact load (1.5 to ~20 lbs TE).

Prior to measurement, the surfaces of the EXG glass substrate composite coating were blown using compressed air to remove dust. The coated glass substrate was coupled to the prism and evaluated for the presence of modes visible before the sharp decrease in reflected intensity that corresponds to the critical angle between prism and substrate. One spot was measured on each of the three pieces for each sample. Reference 8293 refractive index glass was measured with the sample set. Sample values were compared with the value of the reference and the offset was used to correct sample values. The corrected values are reported in this disclosure.

Measurement of Thickness.

The thickness of the composite coatings was measured using a Zygo optical profilometer. The composite coatings were scratched using a razor blade to expose the underlying glass substrate. The scratched area was measured by the profilometer to determine the thickness of the coating.

Measurement of Transmittance.

Percent transmission measurements of the composite coatings on the glass substrates. Measurements were taken in the range of 250 to 850 nm. To obtain transmission measurements, a Perkin Elmer UV/VIS/NIR Spectrometer Lambda 900 was used. UVWin Lab version 3.00.03 software was used to control the instrument. The procedure in the instrument instruction manual was followed. An uncoated glass substrate was used as a blank to zero the instrument prior to making measurements of coated glass substrates.

Measurement of Haze.

To measure sample haze and transmission a Gardner Haze-Gard instrument was used. Samples were placed against the spectral cone and the measurement was started. Haze and transmission were computed according to procedures set forth by The International Commission on Illumination (CIE). The Gardner Haze-Gard instrument measurements were based on the CIE-D65 standard illuminants power distribution. CIE standard illuminant D65 is intended to represent average daylight conditions and has a correlated color temperature of approximately 6500 K.

TABLE 10

| Composite Coating | Thickness (μm) | Refractive Index (588 nm) | %T | %H |
|---|---|---|---|---|
| 1 | 1.54 | 1.7470 | 90.7 | 0.23 |
| 2 | 1.51 | 1.7450 | 90.8 | 0.25 |
| 3 | 1.75 | 1.7296 | 91.2 | 0.25 |
| 4 | 1.78 | 1.7298 | 90.8 | 0.48 |
| 5 | 1.35 | 1.7553 | 92 | 0.23 |
| 6 | 1.42 | 1.7613 | 91.6 | 0.23 |

TABLE 11

| Composite Coating | Thickness (μm) | Refractive Index (588 nm) (Calculated) | %T | %H |
|---|---|---|---|---|
| 7 | 0.9 | 1.76 | | |
| 8 | 1.69 | 1.68 | 92.7 | 0.09 |
| 9 | 0.99 | 1.68 | 92.1 | 0.16 |
| 10 | 0.78 | 1.76 | 92.9 | 0.10 |
| 11 | 0.51 | 1.68 | 91.9 | 0.13 |
| 12 | 0.37 | 1.68 | 91.7 | 0.12 |

TABLE 12

| Composite Coating | Thickness (μm) | Refractive Index (588 nm) (Calculated) | %T | %H |
|---|---|---|---|---|
| 13 | 1.77 | 1.65 | 92.7 | 0.08 |
| 14 | 1.23 | 1.65 | 92.9 | 0.07 |
| 15 | 1.15 | 1.65 | 92.9 | 0.10 |
| 16 | 0.67 | 1.65 | 93.1 | 0.07 |
| 17 | 0.64 | 1.65 | | |
| 18 | 0.37 | 1.65 | 91.5 | 0.25 |

TABLE 13

| Composite Coating | Thickness (μm) | Refractive Index (588 nm) | Abbe Number |
|---|---|---|---|
| 19 | 1.54 | 1.7470 | 29.6 |
| 20 | 1.51 | 1.7450 | 31.1 |
| 21 | 1.75 | 1.7296 | 33.6 |
| 22 | 1.78 | 1.7298 | 32.3 |

TABLE 13-continued

| Composite Coating | Thickness (μm) | Refractive Index (588 nm) | Abbe Number |
|---|---|---|---|
| 23 | 1.35 | 1.7553 | 31.2 |
| 24 | 1.42 | 1.7613 | 31.8 |

TABLE 14

| Composite Coating | Thickness (μm) | Refractive Index (588 nm) | Abbe Number |
|---|---|---|---|
| 25 | 1.21 | 1.7561 | 30.9 |
| 26 | 1.37 | 1.7379 | 31.8 |
| 27 | 1.21 | 1.7582 | 29.6 |
| 28 | 1.15 | 1.7775 | 29.3 |
| 29 | 1.28 | 1.7670 | 29.0 |

In some embodiments, the refractive index of the composite coating is greater than 1.60, or greater than 1.65, or greater than 1.67, or greater than 1.70, or greater than 1.72, or greater than 1.74, or greater than 1.76, or in the range from 1.65-1.80, or in the range from 1.67-1.78, or in the range from 1.70-1.76.

In some embodiments, the Abbe number of the composite coating is greater than 25, or greater than 27, or greater than 29, or greater than 30, or greater than 31, or greater than 32, or greater than 33, or in the range from 25-35, or in the range from 27-34, or in the range from 29-33.

In some embodiments, the glass transition temperature of the composite coating is greater than 55° C., or greater than 60° C., or greater than 70° C., or greater than 80° C., or greater than 90° C., or greater than 100° C., or greater than 110° C., or in the range from 55° C.-135° C., or in the range from 60° C.-130° C., or in the range from 65° C.-120° C., or in the range from 70° C.-110° C.

Nanoreplication

Figure 4:
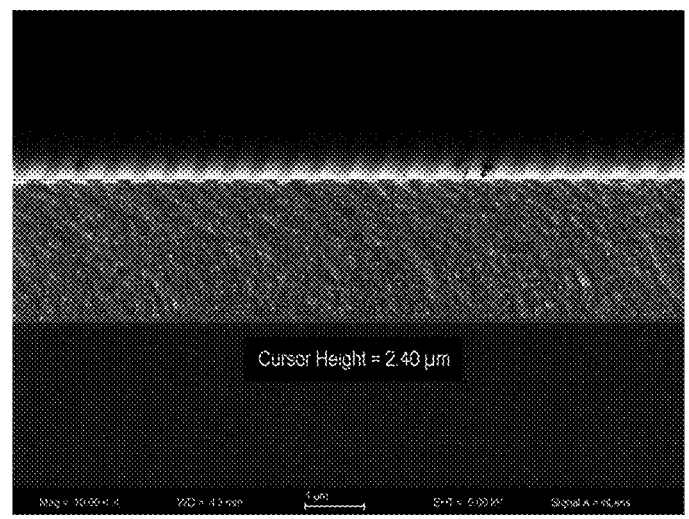
FIGS. 4 and 5 are scanning electron micrographs showing nanoscopic features molded into the surface of a composite in accordance with this disclosure.
Figure 5:
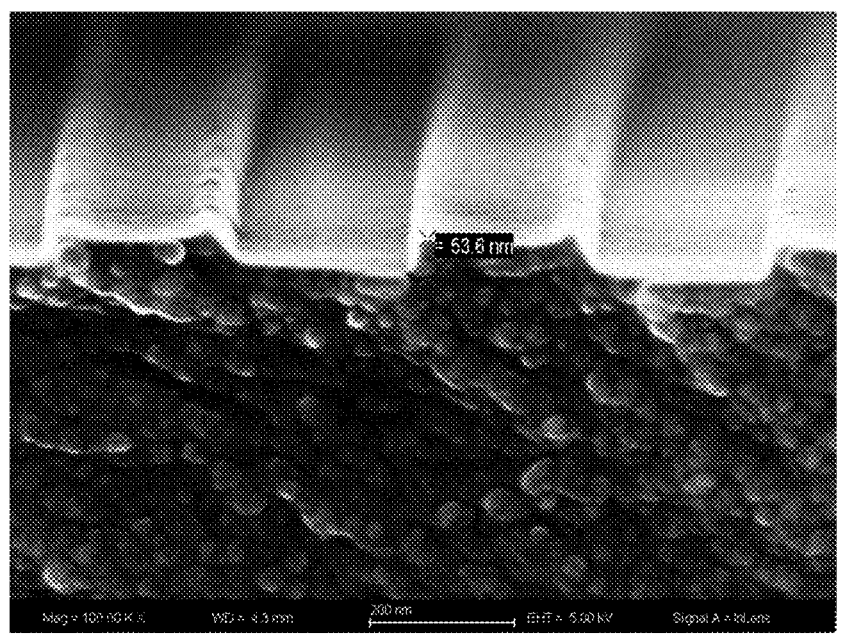

The nanoreplication mold used is a Quartz diffraction grating mold made by Toppan Photomask Inc.; the mold is cleaned by oxygen plasma treatment and coated with (tridecafluoro-1,1,2,2-tetrahydrooctyl) trichlorosilane (Gelest Inc.) under vacuum as the release agent. The replication substrate is first cleaned with isopropanol, Acetone and DI water; the RI series resin is filtered with 0.2 μm PTFE syringe filter and spin-coated onto the substrate at 1000 rpm spinning speed for 30 sec. The resin coated sample is then baked at 80° C. for 3 minutes to remove any residue solvent and then cool down to room temperature. Then the nanoreplication mold is placed on top of the coated sample and compression force is applied onto the mold to ensure resin infiltrate into mold's diffractive grating structures. With the compression pressure on, the UV light is shined through the Quartz mold and cures the resin. Once the resin is cured, the nanoreplication mold is separate from the substrate and reveals the nanoreplication structure as shown in FIGS. 4 and 5.

The described embodiments are preferred and/or illustrated, but are not limiting. Various modifications are considered within the purview and scope of the appended claims.

What is claimed is:

1. A composite coating comprising:
   a resin including a polymer network, the polymer network including repeat units derived from an acrylic or methacrylic monomer or oligomer; and
   inorganic nanoparticles disposed within the resin,
   wherein the composite coating has a refractive index greater than 1.7 and a glass transition temperature greater than 60° C., and
   wherein the polymer network comprises from 25 wt % to 60 wt % repeat units derived from a trifunctional acrylic or methacrylic monomer or oligomer, 40 wt % or more repeat units derived from bifunctional acrylic or methacrylic monomers or oligomers, and, optionally up to 10 wt % repeat units derived from monofunctional monomers or oligomers.

2. The composite coating of claim 1, wherein the polymer network comprises repeat units derived from two or more acrylic or methacrylic monomers or oligomers.

3. The composite coating of claim 1, wherein the coating has an Abbe number greater than 29.0.

4. The composite coating of claim 1, wherein the weight ratio of resin to inorganic nanoparticles in the composite coating is in the range from 1:5 to 1:1.

5. The composite coating of claim 1, wherein the polymer network comprises at least 90% wt % repeat units derived from bifunctional, polyfunctional or a combination of bifunctional and polyfunctional acrylic or methacrylic monomers or oligomers.

6. The composite coating of claim 1, wherein the trifunctional acrylic or methacrylic monomers or oligomers include tris(2-hydroxyethyl isocyanurate) triacrylate; and the bifunctional acrylic or methacrylic monomers or oligomers includes at least one of an aliphatic urethane difunctional acrylate monomer or oligomer, or an aromatic urethane difunctional acrylate monomer or oligomer.

7. The composite coating of claim 6, further including a monofunctional repeat unit that is the residue of at least one monomer wherein the polymer network includes a repeat unit derived from n-vinyl caprolactam or fluorine diacrylate.

8. The composite coating of claim 1, wherein the polymer network comprises from 50 wt % to 100 wt % of repeat units derived from bifunctional acrylic or methacrylic monomers or oligomers, optionally up to 50 wt % of repeat units derived from trifunctional acrylic or methacrylic monomers or oligomers, and optionally up to 10 wt % of repeat units derived from monofunctional monomers or oligomers.

9. The composite coating of claim 8, wherein the bifunctional acrylic or methacrylic monomers or oligomers include fluorene diacrylate (9,9-bis[4-(2-acryloyloxyethyl)phenyl]fluorine) or a urethane bifunctional acrylate oligomer.

10. The composite coating of claim 9, wherein the polymer network includes a repeat unit derived from tris(2-hydroxyethyl isocyanurate) triacrylate.

11. The composite coating of claim 9, wherein the polymer network includes a repeat unit derived from acrylic acid or hydroxybutyl acrylate.

12. The composite coating of claim 1, wherein the inorganic nanoparticles comprise zirconium oxide.

13. The composite coating of claim 12, wherein the zirconium oxide nanoparticles have an average size of about 10 nm or less.

14. The composite coating of claim 1, wherein the inorganic nanoparticles are chemically bonded to the polymer network.

15. The composite coating of claim 1, further including a surface diffraction grating.

16. The composite coating of claim 1, wherein the composite coating has a transmittance greater than 90% and a haze less than 0.3%.

* * * * *